United States Patent
Endo et al.

[11] Patent Number: 6,022,641
[45] Date of Patent: Feb. 8, 2000

[54] NON-AQUEOUS ELECTROLYTE SECONDARY CELL

[75] Inventors: Takuya Endo; Kimio Takahashi, both of Miyagi, Japan

[73] Assignee: Sony Corporation, Tokyo, Japan

[21] Appl. No.: 08/996,320

[22] Filed: Dec. 22, 1997

[30] Foreign Application Priority Data

Dec. 27, 1996 [JP] Japan ................... P08-359248

[51] Int. Cl.$^7$ ............... H01M 4/50; H01M 4/62
[52] U.S. Cl. ............ 429/232; 429/224; 429/231.1
[58] Field of Search ............... 429/224, 231.1, 429/232

[56] References Cited

U.S. PATENT DOCUMENTS

| | | | |
|---|---|---|---|
| 4,913,988 | 4/1990 | Langan | 429/194 |
| 5,474,858 | 12/1995 | Merrit | 429/57 |
| 5,514,488 | 5/1996 | Hake et al. | 429/122 |
| 5,643,695 | 7/1997 | Barker et al. | 429/197 |
| 5,700,442 | 12/1997 | Bloch et al. | 423/599 |
| 5,731,105 | 3/1998 | Fleischer et al. | 429/192 |
| 5,733,685 | 3/1998 | Wang | 429/224 |
| 5,869,207 | 2/1999 | Saidi et al. | 429/224 |

OTHER PUBLICATIONS

Linden "Handbook of Batteries, 2nd Edition", McGraw–Hill Publishers, pp. 36.1 through 38.9 (No Month Available), 1994.

*Primary Examiner*—Maria Nuzzolillo
*Assistant Examiner*—Carol Chaney
*Attorney, Agent, or Firm*—Hill & Simpson

[57] ABSTRACT

Disclosed is a non-aqueous electrolyte secondary cell comprising a cathode made from a cathode compound that comprises a manganese oxide or a lithium-manganese composite oxide, a lithium metal anode or an anode comprising lithium or capable of doping and dedoping lithium ions, and a non-aqueous electrolyte, which is characterized in that the cathode compound contains an alkali metal carbonate of being from 0.5 to 20% by weight of the dry cathode compound. Even when used at high temperatures over room temperature for a long period of time, the cell is deteriorated little.

14 Claims, 1 Drawing Sheet

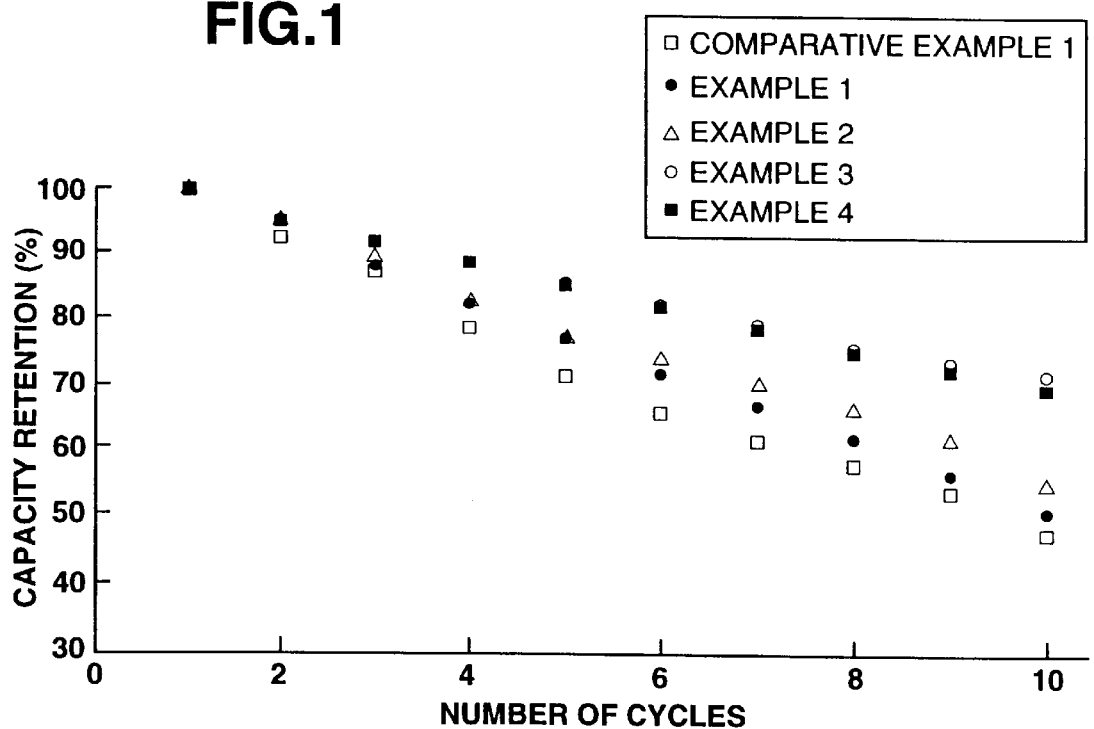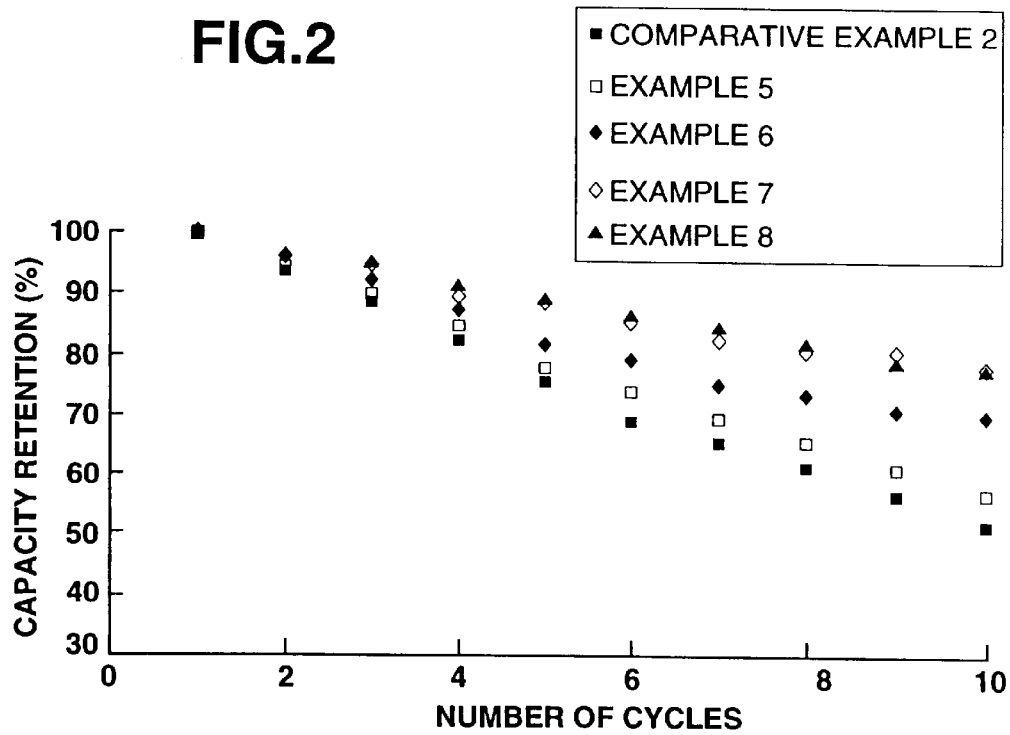

NON-AQUEOUS ELECTROLYTE SECONDARY CELL

BACKGROUND OF THE INVENTION

1. Field of the Invention

The present invention relates to a re-chargeable, nonaqueous electrolyte secondary cell, which is used as a power source for various electronic appliances, and, in particular, it relates to such a non-aqueous electrolyte secondary cell of which the cathode has been improved.

2. Prior Art

With rapid progress in various electronic appliances, the recent studies in the art are toward re-chargeable secondary cells that can be used as power sources conveniently and economically for a long period of time. As typical secondary cells, known are lead accumulators, alkali accumulators, lithium secondary cells, etc. Of those, lithium secondary cells are especially advantageous in that their output is high and their energy density is also high.

Such a lithium secondary battery comprises a cathode of an active material capable of reversibly and electrochemically reacts with lithium ions, metal lithium or an anode containing lithium, and a non-aqueous electrolyte. The discharge reaction occurring in the lithium secondary cell is generally such that lithium ions are dissolved out from the anode into the non-aqueous electrolyte while lithium ions are intercalated in the layers of the active material of the cathode. On the contrary, where the cell is charged, reaction opposite to the discharge reaction occurs in the cell, or that is, lithium ions are de-intercalated in the cathode. Therefore, in the lithium secondary cell of that type, the charge-discharge reaction is repeated on the basis of the movement of the lithium ions which are supplied by the anode and which are absorbed and desorbed by the active material of the cathode.

As the active material for the anode of a lithium secondary cell, for example, generally used are metal lithium, lithium alloys (e.g., Li—Al alloys), lithium-doped, electroconductive polymers (e.g., polyacetylene, polypyrrole), and interlayer compounds having lithium ions as intercalated into their crystal structures. On the other hand, as the active material for the cathode of the cell, for example, generally used are metal oxides, metal sulfides and polymers. Concretely known are $TiS_2$, $MoS_2$, $NbSe_2$ and $V_2O_5$. Recently, a non-aqueous electrolyte secondary cell has been put into practical use, which comprises a cathode active material, $Li_xCo_yO_2$ (in which x varies depending on charging and discharging of the cell, but, in general, x and y each are about 1 (one) just after the production of the compound), having a high discharge potential and a high energy density.

However, since cobalt which is a raw material for the composite oxide is rare on the earth, and, in addition, since ore deposits containing cobalt and capable of being used commercially locally exist only a few limited lands, cobalt is expensive and its price variation is great, and, in addition, there is a probability that cobalt will be in short supply in future. For these reasons, $LiNiO_2$ or $LiMn_2O_4$, which is prepared from raw materials that are more inexpensive than cobalt while existing richly on the earth, and of which the properties are comparable to those of lithium-cobalt composite oxides, is being used as the cathode active material in lithium secondary cells, thereby much popularizing the cells in a variety of fields. In particular, manganese is more inexpensive than not only cobalt but also nickel, and exists more richly than the latter on the earth. Manganese dioxide is much distributed in the market as the material for manganese dry cells, alkali manganese dry cells and lithium primary cells, and there is little probability that it will be in short supply in future. For these reasons, many studies of lithium-manganese composite oxides for the cathode active material in non-aqueous electrolyte secondary cells, which use manganese as one material, are being made in these days. Of those, spinel-structured lithium-manganese composite oxides were reported to have a potential of 3 V or higher relative to lithium and have a theoretical charge-discharge capacity of 148 mAh/g, after having been electrochemically oxidized.

However, lithium ion-containing, non-aqueous electrolyte secondary cells comprising a manganese oxide or a lithium-manganese composite oxide as the cathode active material are defective in that their properties are worsened in charge-discharge cycles. In particular, when the cells are used in high-temperature environment over room temperature, their properties are much worsened.

Especially for large-sized, non-aqueous electrolyte secondary cells for electric cars or for road leveling, the worsening of their properties is serious. This is because, for such large-sized cells, the internal heat to be generated by them in their use could not be negligible. Therefore, even if the ambient temperature around the cells being used is about room temperature, there increases a probability that the internal temperature of the cells will be relatively high. This problem should not be neglected even for relatively small-sized cells to be used in small-sized portable appliances, considering the fact that the appliances will be used in high-temperature environment such as in the rooms of cars in full summer.

OBJECT AND SUMMARY OF THE INVENTION

The present invention is to solve the problems in the prior art, and its object is to improve the cell characteristics (for example, charge-discharge cycle characteristic) of a non-aqueous electrolyte secondary cell of which the cathode comprises a manganese oxide or a lithium-manganese composite oxide that is inexpensive and is rich on the earth, in temperature conditions over room temperature.

We, the present inventors have found that the object can be attained by incorporating a specific amount, in terms of % by weight, of an alkali metal carbonate into a cathode compound (in dry condition) comprising a manganese oxide or lithium-manganese composite oxide, a conductive material and a binder, and have completed the present invention.

Specifically, the invention provides a non-aqueous electrolyte secondary cell comprising a cathode made from a cathode compound that comprises a manganese oxide or a lithium-manganese composite oxide, a lithium metal anode or an anode comprising lithium, and a non-aqueous electrolyte, which is characterized in that the cathode compound contains an alkali metal carbonate of being from 0.5 to 20% by weight of the dry cathode compound.

BRIEF DESCRIPTION OF THE DRAWINGS

FIG. 1 shows the relationship between the number of cycles and the percentage of discharge capacity retentiveness in charge-discharge cycles of coin-type, nonaqueous electrolyte secondary cells prepared in Examples 1 to 4 and Comparative Example 1.

FIG. 2 shows the relationship between the number of cycles and the percentage of discharge capacity retentiveness in charge-discharge cycles of coin-type, nonaqueous electrolyte secondary cells prepared in Examples 5 to 8 and Comparative Example 2.

DETAILED DESCRIPTION OF THE INVENTION

Now, the invention is described in detail hereinunder.

The non-aqueous electrolyte secondary cell of the invention comprises a cathode made from a cathode compound that comprises an active material of a manganese oxide or a lithium-manganese composite oxide, a lithium metal anode or an anode comprising lithium, and a non-aqueous electrolyte, in which the cathode compound contains an alkali metal carbonate. Thus using an alkali metal carbonate as one cathode component, the cell characteristics (for example, charge-discharge cycle characteristic) in temperature conditions over room temperature can be improved. Though the reason for the improvement is not always clear, it may be considered that the alkali metal carbonate added to the cathode compound will selectively react with minor acidic impurities existing in the non-aqueous electrolyte or with substances to be formed in the non-aqueous electrolyte through charge-discharge of the cell, thereby inhibiting the reaction between the cathode active material and those impurities or substances to deteriorate the cathode active material.

The alkali metal carbonate preferably usable in the invention includes, for example, lithium carbonate and sodium carbonate. These may be used either singly or as combined.

The alkali metal carbonate content of the cathode compound is, in dry condition, from 0.5 to 20% by weight, preferably from 0.5 to 10% by weight. If lower than the defined range, the alkali metal carbonate added could not produce sufficient results. However, if larger than it, the amount of the cathode active material shall be relatively decreased, resulting in that the cell capacity could not be on a practical level.

The components except such an alkali metal carbonate that constitute the cathode compound are a cathode active material of a manganese oxide or a lithium-manganese composite oxide, a conductive material, and a binder.

As the manganese oxide, preferred is manganese dioxide. The lithium—manganese composite oxide preferably has a spinel-type crystal structure.

As has been mentioned hereinabove, non-aqueous electrolyte secondary cells comprising a manganese oxide or a lithium-manganese composite oxide as the cathode active material can produce a discharge voltage of 3 V or higher, though depending on the type and the condition of the anode active material therein. Thus, the cells of that type have a high energy density and produce a high output.

As the conductive material to be in the cell of the invention, employable is any known one such as carbon black. As the binder, also employable is any known one such as polyvinylidene fluoride.

The cathode of the non-aqueous electrolyte secondary cell of the invention is prepared by fully dispersing the constituent components in an organic solvent such as dimethylformamide to give a cathode compound slurry, then applying it onto a collector, and thereafter drying the thus-coated collector. Alternatively, the cathode compound slurry may be dried and ground to give a cathode compound powder, which may be press-shaped along with a collector to produce the cathode.

As the anode material for the anode of the non-aqueous electrolyte secondary cell of the invention, employable are carbon materials capable of doping and dedoping lithium ions, and crystalline or amorphous metal chalcogenides. The carbon materials include easily-graphitizable carbon materials, hardly-graphitizable carbon materials and graphite materials.

As the hardly-graphitizable carbon materials, preferred are those of which the physical parameters are such that the spacing for (002) is not smaller than 0.37 nm, that their true density is smaller than 1.70 g/cm$^3$, and that they give no exothermic peak at 700° C. or higher in differential thermal analysis (DTA) in air.

Those hardly-graphitizable carbon materials can be obtained through heat treatment of organic materials at a temperature of about 1000° C.

Typical examples of the starting organic materials are homopolymers or copolymers of furfuryl alcohol and furfural, and furan resins as copolymerized with other resins.

In addition, as the starting organic materials, further mentioned are phenolic resins, acrylic resins, polyvinyl halide resins, polyimide resins, polyamidimide resins, polyamide resins, conjugated resins such as polyacetylene and poly(p-phenylene), cellulose and its derivatives, and any other organic polymer compounds.

Products to be prepared by introducing oxygen-containing functional groups into petroleum pitch having a specific atomic ratio H/C (the introduction is so-called oxygen-crosslinking) can also be used, like the above-mentioned furan resins, as being able to be finally converted into solid-phase, hardly-graphitizable carbon materials without melting in the step of their carbonization (at 400° C. or higher).

The petroleum pitch can be prepared from various tars and asphalt to be obtained through high-temperature thermal cracking of coal tar, ethylene bottom oil and crude oil, by subjecting those tars and asphalt to distillation (vacuum distillation, normal pressure distillation, steam distillation), thermal polycondensation, extraction or chemical polycondensation. Of the petroleum pitch, the atomic ratio H/C is important, and must be between 0.6 and 0.8 in order to prepare the intended hardly-graphitizable carbon from the petroleum pitch.

The means of introducing oxygen-crosslinking into the petroleum pitch is not specifically defined, but may include, for example, a wet process using an aqueous solution of nitric acid, mixed acid, sulfuric acid, hypochlorous acid or the like, a dry process using an oxidizing gas (air, oxygen), and even reaction with a solid reagent such as sulfur, ammonium nitrate, ammonium persulfate, ferric chloride or the like.

The oxygen content of the resulting, oxygen-crosslinked petroleum pitch is not specifically defined, but is preferably not smaller than 3%, more preferably not smaller than 5%, as in JP-A-3-252053. This oxygen content has an influence on the crystal structure of the carbon material to be finally prepared from the petroleum pitch. Precisely, the carbon material as prepared from the petroleum pitch, of which the oxygen content falls within the defined range, has physical parameters of such that the spacing for (002) is not smaller than 0.37 nm and that no exothermic peak appears at 700° C. or higher in differential thermal analysis (DTA) in air, as so mentioned hereinabove, and the capacity of the anode made from the carbon material is large.

The starting organic materials for the hardly-graphitizable carbon materials are not limited to those mentioned hereinabove, but employable are any other organic materials capable of being converted into intended, hardly-graphitizable carbon materials through oxygen-crosslinking followed by solid-phase carbonization.

Apart from the hardly-graphitizable carbon materials to be prepared from the starting organic materials mentioned hereinabove, other compounds consisting essentially of phosphorus, oxygen and carbon, such as those described in JP-A-3-137010, also have physical parameters similar to those of the hardly-graphitizable carbon materials, and are favorably used to make the anode for the invention.

The hardly-graphitizable carbon materials are prepared by firing organic materials such as those mentioned hereinabove to carbonize them, and the firing is preferably effected in the following process.

To produce the hardly-graphitizable carbon materials, organic materials are carbonized at 300 to 700° C., then fired at a heating rate of from 1 to 100° C./min up to a final temperature falling between 900 and 1300° C., and kept at the final temperature for about 0 to 30 hours or so. As the case may be, the carbonization may be omitted. The resulting sintered bodies are ground, classified and used to produce the anode for use in the invention. The grinding may be effected either before or after the carbonization, calcination and high-temperature heat-treatment or may be even in the heating step.

The graphite materials for the anode preferably have a true density of not smaller than 2.1 g/cm$^3$, more preferably not smaller than 2.18 g/cm$^3$. To have a true density falling within the defined range, the graphite materials must have a spacing for (002) as measured through X-ray diffractometry of preferably smaller than 0.340 nm, more preferably from 0.335 nm to 0.337 nm, and have a C-axis crystal lattice thickness for (002) of not smaller than 14.0 nm.

The graphite materials having the physical properties mentioned above are selectively used in the invention, for which may be used either natural graphites or artificial graphites to be obtained by carbonizing organic materials followed by treating them at high temperatures.

The organic materials from which artificial graphites are produced are typically coal and pitch.

The pitch may be one to be obtained through distillation (vacuum distillation, normal pressure distillation, steam distillation), thermal polycondensation, extraction or chemical polycondensation of various tars and asphalt as obtained through high-temperature thermal cracking of coal tar, ethylene bottom oil and crude oil, and may be one to be produced in dry distillation of wood.

The starting materials from which the pitch is produced include, for example, polyvinyl chloride resins, polyvinyl acetates, polyvinyl butyrates, and 3,5-dimethylphenolic resins.

Those coal and pitch exist in liquid during their carbonization at a highest temperature of about 400° C. or so, and their aromatic rings are condensed together while they are kept at the carbonizing temperature to give polycyclic rings as laminated and oriented, and thereafter when they are heated at a temperature of about 500° C. or higher, they give solid carbon precursors of so-called semi-cokes. This process is referred to as a liquid-phase carbonization process, which is a typical process of producing easily-graphitizable carbons.

Apart from those starting materials mentioned hereinabove, further usable are condensed, polycyclic hydrocarbon compounds such as naphthalene, phenanthrene, anthracene, triphenylene, pyrene, perylene, pentaphene, pentacene; their derivatives (for example, their carboxylic acid derivatives, carboxylic acid anhydride derivatives, carboxylic acid imide derivatives) or their mixtures; condensed heterocyclic compounds such as acenaphthylene, indole, isoindole, quinoline, isoquinoline, quinoxaline, phthalazine, carbazole, acridine, phenazine, phenanthridine; and their derivatives.

To produce artificial graphites from those organic materials, for example, the organic materials are carbonized in an inert gas stream of nitrogen or the like at a temperature falling between 300 and 700° C., then calcined by heating them in the inert gas stream at a heating rate of from 1 to 100° C./min up to a final temperature falling between 900 and 1500° C. followed by keeping them at the final temperature for 0 to 30 hours or so, and thereafter heat-treated at a temperature of 2000° C. or higher, preferably 2500° C. or higher. Needless-to-say, the carbonization and the calcination may be omitted, as the case may be.

The thus-produced graphite materials are classified, or are ground and classified. The grinding may be effected before or after the carbonization and calcination, or even in the heating step prior to the graphitization. In those cases, the materials are finally heat-treated in powder for the graphitization.

The non-aqueous solvent for the non-aqueous electrolyte to be in the non-aqueous electrolyte secondary cell of the invention is preferably a mixed solvent that is comprised of an essential solvent having a relatively high dielectric constant, such as ethylene carbonate, and a plurality of low-viscosity solvents. One reason for this is because such a mixed solvent is extremely effective for preventing the cycle characteristic of the cell from being worsened and for preventing the capacity of the cell from being lowered at low temperatures.

Apart from ethylene carbonate (EC), usable as the high-dielectric-constant solvent are propylene carbonate (PC), butylene carbonate (BC), vinylene carbonate (VC), sulfolanic acid, butyrolactonic acid, valerolactones, etc.

As the low-viscosity solvent, usable are symmetric linear carbonates such as diethyl carbonate, dimethyl carbonate; asymmetric linear carbonates such as urethylethyl carbonate, methylpropyl carbonate; carboxylates such as methyl propionate, ethyl propionate; and even phosphates such as trimethyl phosphate, triethyl phosphate. One or more of these can be used singly or as combined.

Where the anode in the cell of the invention is made from a graphite material, ethylene carbonate or its derivatives to be prepared by substituting the hydrogen atom(s) of ethylene carbonate with halogen(s) are preferably used as the essential solvent, as being more hardly decomposed by graphite than any other high-dielectric-constant solvents.

Solvents such as propylene carbonate, which are reactive with graphite materials, may be used as additional components in the mixed solvent that comprises, as the essential solvent, ethylene carbonate or its halogenated derivative, so far as they are to substitute for a part of the essential solvent.

Apart from propylene carbonate, the solvents usable as such additional components include butylene carbonate, vinylene carbonate, 1,2-dimethoxyethane, 1,2-diethoxyethane, γ-butyrolactone, valerolactone, tetrahydrofuran, 2-methyltetrahydrofuran, 1,3-dioxolane, 4-methyl-1,3-dioxolane, sulfolane, methylsulfolane, etc. Of those, preferred are carbonates such as propylene carbonate, butylene carbonate and vinylene carbonate. It is; desirable that the amount of such additional components to be in the mixed solvent is not larger than 40% by volume, preferably not larger than 20% by volume.

The electrolyte to be dissolved in such a non-aqueous solvent to prepare a non-aqueous electrolytic solution for use in the invention includes $LiPF_6$, $LiClO_4$, $LiAsF_6$, $LiBF_4$, $LiB(C_6H_5)_4$, $CH_3SO_3Li$, $CF_3SO_3Li$, $LiN(CF_3SO_2)_2$, $LiC(CF_3SO_2)_3$, LiCl, LiBr, etc. Generally depending on the type of the conductive ion constituting them, those electrolytes comprising lithium as the conductive ion may be used either singly or as combined to prepare the non-aqueous electrolytic solution. Where two or more electrolytes are combined, it is desirable that $LiPF_6$ is the essential component of the combined electrolytes.

The other constituents such as the separator, the cell cover and the thermal resistance device (PTC device) that constitute the non-aqueous electrolyte secondary cell of the invention may be the same as those of conventional, lithium ion-containing, non-aqueous electrolyte secondary cells.

The non-aqueous electrolyte secondary cell of the invention may be produced in the same manner as in the production of conventional non-aqueous electrolyte secondary cells, except that an alkali metal carbonate is added to the cathode compound for the cell of the invention.

The shape of the non-aqueous electrolyte secondary cell of the invention is not specifically defined, and the cell may be in any form of cylinders, boxes, coins, buttons, etc.

Now, the invention is described in more detail with reference to the following Examples, which, however, are not intended to restrict the scope of the invention.

Briefly, Examples 1 to 4 and Comparative Example 1 are to demonstrate cell samples of which the cathode contains a spinel-structured lithium-manganese composite oxide of $LiMn_2O_4$ and for which an alkali metal carbonate of lithium carbonate is added to or is not added to the cathode compound. Examples 5 to 8 and Comparative Example 2 are to demonstrate cell samples of which the cathode contains the same spinel-structured lithium-manganese composite oxide of $LiMn_2O_4$ but for which an alkali metal carbonate of sodium carbonate is added to or is not added to the cathode compound.

EXAMPLE 1

Commercially-available manganese carbonate ($MnCO_3$) powder and lithium carbonate ($Li_2CO_3$) powder were mixed in an agate mortar in a mixing ratio, Li/Mn=½. Using an electric furnace, the resulting powder mixture was, heated in air at normal pressure at 800° C to give a lithium-manganese composite oxide. This sample was analyzed through powdery X-ray diffractometry, which gave the same data of $LiMn_2O_4$ as those described in ISDD Card 35-782.

The thus-obtained lithium-manganese composite oxide powder was mixed with lithium carbonate ($Li_2CO_3$) powder, a conductive material of graphite and a binder of polyvinylidene fluoride, to which was dropwise added a necessary amount of dimethylformamide, and then fully kneaded. The thus-kneaded mixture was dried and ground to obtain a powdery cathode compound. The lithium carbonate content of the dry cathode compound was 0.5% by weight.

The thus-obtained, powdery cathode compound was molded under pressure along with aluminium mesh. Using this molding as the cathode, a coin-type cell sample was prepared in which the anode was lithium and the electrolyte was a propylene carbonate solution of lithium hexafluorophosphate (1 mol/liter).

EXAMPLE 2

A powdery cathode compound was prepared in the same manner as in Example 1, except that the lithium carbonate content of the dry cathode compound was 5% by weight. Using this, a coin-type cell sample was prepared also in the same manner as in Example 1.

EXAMPLE 3

A powdery cathode compound was prepared in the same manner as in Example 1, except that the lithium carbonate content of the dry cathode compound was 10% by weight. Using this, a coin-type cell sample was prepared also in the same manner as in Example 1.

EXAMPLE 4

A powdery cathode compound was prepared in the same manner as in Example 1, except that the lithium carbonate content of the dry cathode compound was 20% by weight. Using this, a coin-type cell sample was prepared also in the same manner as in Example 1.

COMPARATIVE EXAMPLE 1

A powdery cathode compound was prepared in the same manner as in Example 1, except that lithium carbonate was not added thereto. Using this, a coin-type cell sample was prepared also in the same manner as in Example 1.

Evaluation of Cell Samples

The coin-type cell samples as prepared in Examples 1 to 4 and Comparative Example 1 were subjected to a charge-discharge cycle test under an accelerated test condition at a cell temperature of 60° C. Precisely, in the test, each cell sample was charged up to 4.2 V at a current density of 0.27 $mA/cm^2$, and then further charged through constant-voltage charging at 4.2 V up to saturation charge (constant-current, constant-voltage charging). Next, the thus-charged cell sample was discharged down to 3.7 V. In this charge-discharge cycle test, the percentage of capacity retention of each cell sample at each cycle was obtained and shown in FIG. 1. The percentage of capacity retention is a ratio of the discharge capacity of a cell sample at each cycle to the discharge capacity of the same cell sample at the first cycle.

From FIG. 1, it is known that the degree of discharge capacity depression in the non-aqueous electrolyte secondary cell samples as prepared in Examples 1 to 4 is smaller than that in the cell sample as prepared in Comparative Example 1.

Comparing the data of the cell samples of Examples 3 and 4 in FIG. 1, it is anticipated that the addition to the cathode compound of a large amount of lithium carbonate of larger than 20% by weight of the dry cathode compound could not produce any better results. Moreover, it is known that the increase in the amount of lithium carbonate as added to the cathode compound results in the relative decrease in the active material content of the cathode to lower the cell capacity. Accordingly, it is understood that the lithium carbonate content of the cathode compound is preferably not larger than 20% by weight of the dry cathode compound.

On the other hand, from the data of the cell samples of Example 1 and Comparative Example 1, it is known that the addition to the cathode compound of lithium carbonate of smaller than 0.5% by weight of the dry cathode compound could not produce good results.

From the above, it is understood that the lithium carbonate content of the cathode compound is reasonably from 0.5 to 20% by weight of the dry cathode compound.

Examples 5 to 8, and Comparative Example 2

Cathode compounds were prepared in the same manner as in Examples 1 to 4 and Comparative Example 1, except that sodium carbonate was used in place of lithium carbonate and that no sodium carbonate was used. Using those cathode compounds, prepared were coin-type, non-aqueous electrolyte secondary cell samples were prepared in the same manner as above. The thus-prepared cell samples were subjected to the same charge-discharge cycle test as in Example 1, and the data obtained are shown in FIG. 2.

From FIG. 2, it is known that the degree of discharge capacity depression in the non-aqueous electrolyte secondary cell samples as prepared in Examples 5 to 8 is smaller than that in the cell sample as prepared in Comparative Example 2.

Comparing the data of the cell samples of Examples 7 and 8 in FIG. 2, it is anticipated that the addition to the cathode compound of a large amount of sodium carbonate of larger than 20% by weight of the dry cathode compound could not produce any better results. Moreover, it is known that the increase in the amount of sodium carbonate as added to the cathode compound results in the relative decrease in the active material content of the cathode to lower the cell capacity. Accordingly, it is understood that the sodium carbonate content of the cathode compound is preferably not larger than 20% by weight of the dry cathode compound.

On the other hand, from the data of the cell samples of Example 5 and Comparative Example 2, it is known that the addition to the cathode compound of sodium carbonate of smaller than 0.5% by weight of the dry cathode compound could not produce good results.

From the above, it is understood that: the sodium carbonate content of the cathode compound is reasonably from 0.5 to 20% by weight of the dry cathode compound.

While the invention has been described in detail and with reference to specific embodiments thereof, it will be apparent to one skilled in the art that various changes and modifications can be made therein without departing from the spirit and scope thereof.

What is claimed is:

1. A non-aqueous electrolyte secondary cell comprising:
   a cathode comprising an active cathode material comprising a manganese oxide or a lithium manganese composite oxide, and from about 0.5 to about 20% by weight, based on dry weight of the active cathode material, of sodium carbonate;
   an anode comprising lithium or lithium metal; and
   a non-aqueous electrolyte.

2. A non-aqueous electrolyte secondary cell comprising a cathode comprising an active cathode material comprising a manganese oxide or a lithium-manganese composite oxide and from about 0.5 to about 20% by weight, based on dry weight of the active cathode material, of sodium carbonate;
   an anode capable of doping and dedoping lithium ions; and
   a non-aqueous electrolyte.

3. A non-aqueous electrolyte secondary cell as defined in claim 1, wherein said non-aqueous electrolyte comprises a solution of a lithium salt in a mixed solvent system including at least one high dielectric constant solvent selected from the group consisting of ethylene carbonate, propylene carbonate, butylene carbonate, vinylene carbonate, sulfolanic acid, butyrolactonic acid and valerolactonic acid and at least one low viscosity solvent selected from the group consisting of diethyl carbonate, dimethyl carbonate, methyl ethyl carbonate, methyl propyl carbonate, methyl propionate, ethyl propionate, trimethyl phosphate and triethyl phosphate.

4. A non-aqueous electrolyte secondary cell as defined in claim 2, wherein said non-aqueous electrolyte comprises a solution of a lithium salt in a mixed solvent system including at least one high dielectric constant solvent selected from the group consisting of ethylene carbonate, propylene carbonate, butylene carbonate, vinylene carbonate, sulfolanic acid, butyrolactonic acid and valerolactonic acid and at least one low viscosity solvent selected from the group consisting of, of diethyl carbonate, dimethyl carbonate, methyl ethyl carbonate, methyl propyl carbonate, methyl propionate, ethyl propionate, trimethyl phosphate and triethyl phosphate.

5. A non-aqueous electrolyte secondary cell as defined in claim 1, wherein said active cathode material consists essentially of:
   (i) a manganese oxide or a lithium manganese composite oxide;
   (ii) a conductive material;
   (iii) a binder; and
   (iv) from about 0.5 to about 20% by weight based on dry weight of the active cathode material, of sodium carbonate.

6. A non-aqueous electrolyte secondary cell as defined in claim 2, wherein said active cathode material consists essentially of:
   (i) a manganese oxide or a lithium manganese composite oxide;
   (ii) a conductive material;
   (iii) a binder; and
   (iv) from about 0.5 to about 20% by weight based on dry weight of the active cathode material, of sodium carbonate.

7. The non-aqueous electrolyte secondary cell as claimed in claim 1, in which the lithium-manganese composite oxide has a spinel-type crystal structure.

8. The non-aqueous electrolyte secondary cell as claimed in claim 1, of which the discharge voltage is 3 V or higher.

9. The non-aqueous electrolyte secondary cell as claimed in claim 2, in which the anode is made from a carbon material.

10. The non-aqueous electrolyte secondary cell as claimed in claim 9, in which the carbon material is a graphite material or a hardly-graphitizable carbon material.

11. The non-aqueous electrolyte secondary cell as claimed in claim 10, in which the graphite material has a true density of not smaller than 2.1 g/cm$^3$, a spacing for (002) of from 0.335 nm to 0.337 nm, and a C-axis crystal lattice thickness for (002) of not smaller than 14.0 nm.

12. The non-aqueous electrolyte secondary cell as claimed in claim 10, in which the hardly-graphitizable carbon material has a spacing for (002) of not smaller than 0.37 nm, and a true density of smaller than 1.70 g/cm$^3$, and gives no exothermic peak at 700° C. or higher in differential thermal analysis in air.

13. The non-aqueous electrolyte secondary cell as claimed in claim 2, in which the lithium-manganese composite oxide has a spinel-type crystal structure.

14. The non-aqueous electrolyte secondary cell as claimed in claim 2, of which the discharge voltage is 3 V or higher.

* * * * *